(12) United States Patent
Gentry et al.

(10) Patent No.: US 12,729,475 B2
(45) Date of Patent: Sep. 8, 2026

(54) HIGH PRIORITY MODE FOR A COMMERCIAL LAUNDRY ENVIRONMENT

(71) Applicant: Haier US Appliance Solutions, Inc., Wilmington, DE (US)

(72) Inventors: Evan Gentry, Louisville, KY (US); Andrew Uyeda, Louisville, KY (US); Joshua Reeves, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 288 days.

(21) Appl. No.: 18/523,472

(22) Filed: Nov. 29, 2023

(65) Prior Publication Data

US 2025/0171944 A1 May 29, 2025

(51) Int. Cl.

*G06Q 10/02* (2012.01)
*D06F 34/05* (2020.01)
*D06F 34/28* (2020.01)
*H04W 4/33* (2018.01)
*D06F 101/04* (2020.01)
*D06F 101/20* (2020.01)

(52) U.S. Cl.

CPC .............. *D06F 34/05* (2020.02); *D06F 34/28* (2020.02); *G06Q 10/02* (2013.01); *H04W 4/33* (2018.02); *D06F 2101/04* (2020.02); *D06F 2101/20* (2020.02)

(58) Field of Classification Search

CPC .......... D06F 34/05; D06F 34/28; D06F 31/00; D06F 33/30; D06F 2101/04; D06F 2101/00; D06F 2101/06; D06F 2105/00; D06F 2101/20; D06F 2101/02; G06Q 10/02; H04W 4/33

See application file for complete search history.

(56) References Cited

U.S. PATENT DOCUMENTS 9,367,058 B2 * 6/2016 Kang .................. H04L 12/2825
11,098,429 B2 8/2021 Belveal et al.
2017/0085390 A1 * 3/2017 Belveal .................. D06F 35/00
2020/0295963 A2 * 9/2020 Dulski .................... H04L 69/14

(Continued)

FOREIGN PATENT DOCUMENTS

CN 110499611 A 11/2019
CN 113408766 A 9/2021

(Continued)

OTHER PUBLICATIONS

Khan et al., Time and Device Based Priority Induced Demand Side Load Management in Smart Home with Consumer Budget Limit, 2018, IEEE, p. 874-881 (Year: 2018).*

(Continued)

*Primary Examiner* — McDieunel Marc
(74) *Attorney, Agent, or Firm* — Dority & Manning, P.A.

(57) ABSTRACT

A method of coordinating engagement with a group of laundry appliances includes a step of receiving, wirelessly, a high priority input defining a high priority mode for a user account associated with the group of laundry appliances. The method also includes a step of receiving, wirelessly, a load input defining load characteristics of a load of articles following receiving the high priority input. The method further includes reserving one or more laundry appliances for the user account based on the load input received.

16 Claims, 3 Drawing Sheets

(56) References Cited

U.S. PATENT DOCUMENTS

2021/0165377 A1* 6/2021 Yoon ........................ D06F 34/04
2025/0063345 A1* 2/2025 Hu ........................ H04W 12/71

FOREIGN PATENT DOCUMENTS

CN 115457710 B 3/2023
KR 102292791 B1 8/2021

OTHER PUBLICATIONS

Liu et al., Real-time household load priority scheduling algorithm based on prediction of renewable source availability, 2012, IEEE, p. 318-326 (Year: 2012).*
Ihsane et al., Real-time management model for residential multi-class appliances, 2017, IEEE, p. 1-6 (Year: 2017).*
Protopapadakis et al., Non-Intrusive Load Monitoring for Personalized Strategies Towards Energy Consumption Reduction, 2019, IEEE, p. 1-6 (Year: 2019).*

* cited by examiner

HIGH PRIORITY MODE FOR A COMMERCIAL LAUNDRY ENVIRONMENT

FIELD OF THE INVENTION

The present subject matter relates generally to a commercial laundry environment, and more particularly, to a high priority mode for a commercial laundry environment.

BACKGROUND OF THE INVENTION

Laundry appliances generally include washing machine appliances and dryer appliances. Some laundry appliances are publicly available for rent or temporary use (e.g., commercial laundry appliances). For instance, multiple laundry appliances may be installed in a commercial laundry environment (e.g., a laundromat, dormitory, apartment building, etc.) for rent or temporary use by users. Conventionally, commercial laundry environments have utilized a first-come, first-served system. In other words, a user can arrive at the commercial laundry environment and utilize laundry appliances (e.g., washing machine appliances and dryer appliances) on a first-come, first-served basis. In such commercial laundry environments, users can endure unpredictable wait times for available laundry appliances. This can be caused by unpredictable usage patterns of the commercial laundry.

To mitigate or reduce unpredictability, many commercial laundry environments employ reservations systems (e.g., via online platforms or apps). Such systems may improve efficiency in laundry appliance usage or enhance user convenience. The reservation system can allow users to register user accounts, select available machines, and reserve specific times for their laundry needs. However, challenges exist with such reservation systems. For example, users that wish to minimize the amount of time spent in the commercial laundry environment still can have long wait times.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of coordinating engagement with a group of laundry appliances is provided. The method may include a step of receiving, wirelessly, a high priority input defining a high priority mode for a user account associated with the group of laundry appliances. The method may also include a step of receiving, wirelessly, a load input defining load characteristics of a load of articles following receiving the high priority input. The method may further include a step of reserving one or more laundry appliances for the user account based on the load input received.

In another exemplary aspect of the present disclosure, a method of coordinating engagement with a group of laundry appliances is provided. The method may include a step of receiving a high priority input defining a high priority mode for a user account associated with the group of laundry appliances. The method may also include a step of receiving a load input defining load characteristics of a load of laundry following receiving the high priority input. The method may further include a step of reserving one or more laundry appliances based on the load input received.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
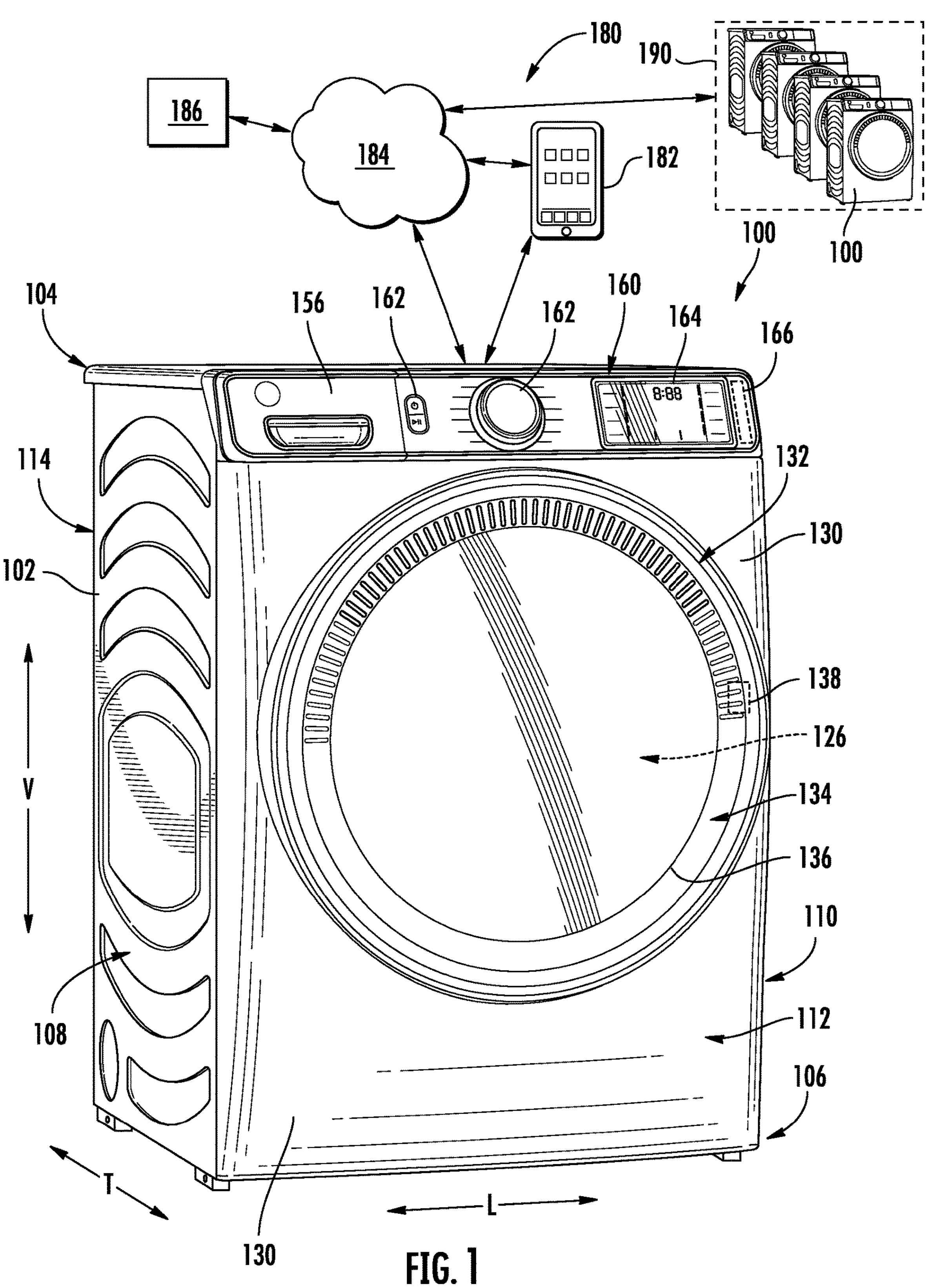
FIG. 1 provides a perspective view of an exemplary system, including a laundry appliance, according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise, or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations.

Aspects of the present subject matter may notably provide users with a way of exchanging priority in a commercial laundry environment (e.g., improving efficiency or convenience in comparison to existing reservation systems). Additional or alternative aspects of the present disclosure may advantageously provide a system or method that can help coordinate high priority engagement for a user account associated with a group of laundry appliances.

Figure 2:
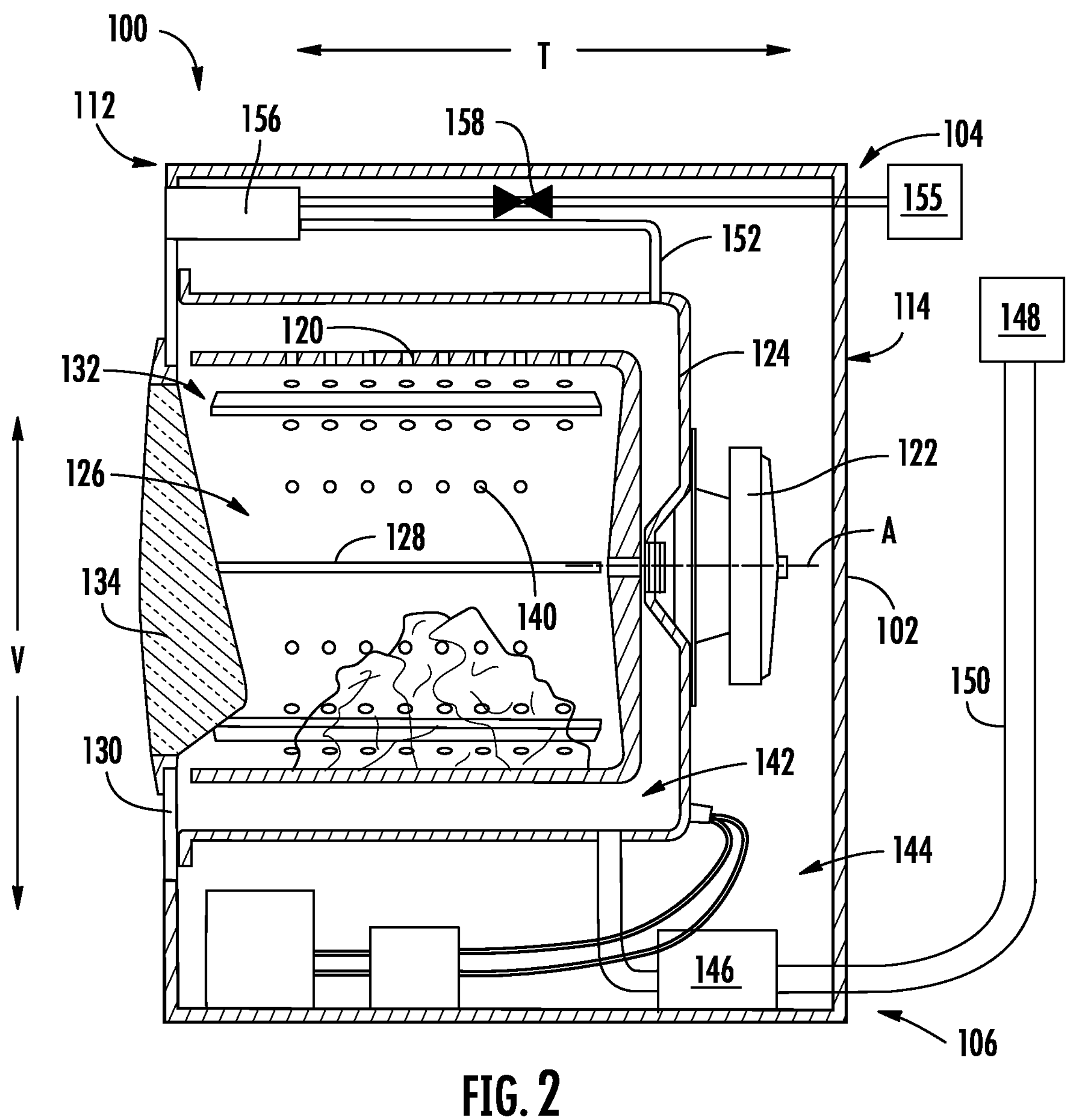
FIG. 2 provides a side cross-sectional view of the exemplary laundry appliance of FIG. 1.

Referring now to the figures, an exemplary laundry appliance that may be used to implement aspects of the present subject matter will be described. Specifically, FIG. 1 is a perspective view of an exemplary horizontal axis washing machine appliance 100 and FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined.

According to exemplary embodiments, washing machine appliance 100 includes a cabinet 102 that is generally configured for containing or supporting various components of washing machine appliance 100 and which may also define one or more internal chambers or compartments of washing machine appliance 100. In this regard, as used herein, the terms "cabinet," "housing," and the like are generally intended to refer to an outer frame or support structure for washing machine appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of washing machine appliance 100. By contrast, cabinet 102 may enclose some or all portions of an interior of the cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing washing machine appliance 100.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments. Washing machine appliance 100 may further include a latch assembly 138 (see FIG. 1) that is mounted to cabinet 102 or door 134 for selectively locking door 134 in the closed position or confirming that the door is in the closed position. Latch assembly 138 may be desirable, for example, to ensure only secured access to wash chamber 126 or to otherwise ensure and verify that door 134 is closed during certain operating cycles or events.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

Washing machine appliance 100 may further include a wash fluid dispenser that is generally configured for dispensing a flow of water, wash fluid, etc. into wash tub 124. For example, a spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present subject matter.

In addition, a water supply valve 158 may provide a flow of water from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

During operation of washing machine appliance 100, laundry items are loaded into wash basket 120 through opening 132, and washing operation is initiated through operator manipulation of one or more input selectors or using a remote device (see below). Wash tub 124 is filled with water, detergent, or other fluid additives, e.g., via spout 152 or detergent drawer 156. One or more valves (e.g., water supply valve 158) can be controlled by washing machine appliance 100 to provide for filling wash basket 120 to the appropriate level for the amount of articles being washed or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, or rinsed, the user can remove the articles from wash basket 120, e.g., by opening door 134 and reaching into wash basket 120 through opening 132.

Referring again to FIG. 1, washing machine appliance 100 may include a control panel 160 that may represent a general-purpose Input/Output ("GPIO") device or functional block for washing machine appliance 100. In some embodiments, control panel 160 may include or be in operative communication with one or more user input devices 162, such as one or more of a variety of digital, analog, electrical, mechanical, or electro-mechanical input devices including rotary dials, control knobs, push buttons, toggle switches, selector switches, and touch pads. Additionally, washing machine appliance 100 may include a display 164, such as a digital or analog display device generally configured to provide visual feedback regarding the operation of washing machine appliance 100. For example, display 164 may be provided on control panel 160 and may include one or more status lights, screens, or visible indicators. According to exemplary embodiments, user input devices 162 and display 164 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Washing machine appliance 100 may further include or be in operative communication with a processing device or a controller 166 that may be generally configured to facilitate appliance operation. In this regard, control panel 160, user input devices 162, and display 164 may be in communication with controller 166 such that controller 166 may receive control inputs from user input devices 162, may display information using display 164, and may otherwise regulate operation of washing machine appliance 100. For example, signals generated by controller 166 may operate washing machine appliance 100, including any or all system components, subsystems, or interconnected devices, in response to the position of user input devices 162 and other control commands. Control panel 160 and other components of washing machine appliance 100 may be in communication with controller 166 via, for example, one or more signal lines or shared communication busses. In this manner, Input/Output ("I/O") signals may be routed between controller 166 and various operational components of washing machine appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 166 may be constructed without using a microprocessor, e.g., using a combination of discrete analog or digital logic circuitry (such as switches, amplifiers, integrators, comparators, flip-flops, OR gates, and the like) to perform control functionality instead of relying upon software.

Controller 166 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information or data accessible by the one or more processors, including instructions that can be executed by the one or more processors. It should be appreciated that the instructions can be software written in any suitable programming language or can be implemented in hardware. Additionally, or alternatively, the instructions can be executed logically or virtually using separate threads on one or more processors.

For example, controller 166 may be operable to execute programming instructions or micro-control code associated with an operating cycle of washing machine appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 166 as disclosed herein is capable of and may be operable to perform any methods, method steps, or portions of methods of appliance operation. For example, in some embodiments, these methods may be embodied in programming instructions stored in the memory and executed by controller 166.

The memory devices may also store data that can be retrieved, manipulated, created, or stored by the one or more processors or portions of controller 166. The data can include, for instance, data to facilitate performance of methods described herein. The data can be stored locally (e.g., on controller 166) in one or more databases or may be split up so that the data is stored in multiple locations. Additionally or alternatively, the one or more database(s) can be connected to controller 166 through any suitable network(s), such as through a high bandwidth local area network (LAN) or wide area network (WAN). In this regard, for example, controller 166 may further include a communication module or interface that may be used to communicate with one or more other component(s) of washing machine appliance 100, controller 166, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Referring again to FIG. 1, a schematic diagram of an external communication system 180 will be described according to an exemplary embodiment of the present subject matter. In general, external communication system 180 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 180 may be used to transfer data or other information to improve performance of one or more external devices or appliances or improve user interaction with such devices.

For example, external communication system 180 permits controller 166 of washing machine appliance 100 to communicate with one or more separate devices external to washing machine appliance 100. Each device of the one or more separate devices may be referred to generally herein as an external (e.g., remote) device 182. As described in more detail below, these communications may be facilitated using a wired or wireless connection, such as via a network 184.

In general, each external device 182 may be any suitable device separate from washing machine appliance 100 that is configured to provide or receive communications, information, data, or commands from a user. In this regard, each external device 182 may be, for example, a personal phone, a smartphone, a tablet, a laptop or personal computer, a wearable device, a smart home system, or another mobile or remote device.

In addition, a remote server 186 may be in communication with washing machine appliance 100 or each external device 182 through network 184. In this regard, for example, remote server 186 may be a cloud-based server 186, and is thus located at a distant location, such as in a separate state, country, etc. According to an exemplary embodiment, each external device 182 may communicate with a remote server 186 over network 184, such as the Internet, to transmit/receive data or information, provide user inputs, receive user notifications or instructions, interact with or control washing machine appliance 100, etc. In addition, each external device 182 and remote server 186 may communicate with washing machine appliance 100 to communicate similar information.

In general, communication between washing machine appliance 100, each external device 182, remote server 186, or other user devices or appliances may be carried using any type of wired or wireless connection and using any suitable type of communication network, non-limiting examples of which are provided below. For example, each external device 182 may be in direct or indirect communication with washing machine appliance 100 through any suitable wired or wireless communication connections or interfaces, such as network 184. For example, network 184 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), or protection schemes (e.g., VPN, secure HTTP, SSL).

External communication system 180 is described herein according to an exemplary embodiment of the present subject matter. However, it should be appreciated that the exemplary functions and configurations of external communication system 180 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

While described in the context of a specific embodiment of horizontal axis washing machine appliance 100, using the teachings disclosed herein it will be understood that horizontal axis washing machine appliance 100 is provided by way of example only. Other laundry appliances having different configurations, different appearances, or different features may also be utilized with the present subject as well. Such laundry appliances may include a vertical axis washing machine appliance, dryer appliance, combined washer/dryer appliance, etc., as would be understood in light of the present disclosure.

Referring still to FIG. 1, washing machine appliance 100 may be utilized as a commercial washer in a commercial laundry environment (e.g., a laundromat, dormitory, apartment building, etc.). In this regard, as used herein, discussion of the use of laundry appliances in a commercial setting may generally refer to the use of the appliance in any location where two or more appliances are provided for use by consumers. These commercial laundry environments may include a large number of washing machine appliances and dryer appliances that may be publicly available for rent (e.g., pay-per-use operation such as via cash, coins, digital currency, or other forms of payment) or temporary use.

For example, as shown in FIG. 1, washing machine appliance 100 may be located in a commercial laundry environment (e.g., as identified generally by reference numeral 190) along with other washing machine appliances, dryer appliances, etc. In general, each of the laundry appliances (e.g., washers or dryers) may all be in operative communication with each other and a remote server 186 through a network 184, as described above. In this manner, these network-connected appliances may communicate with each other to facilitate implementation of the various methods described herein.

Figure 3:
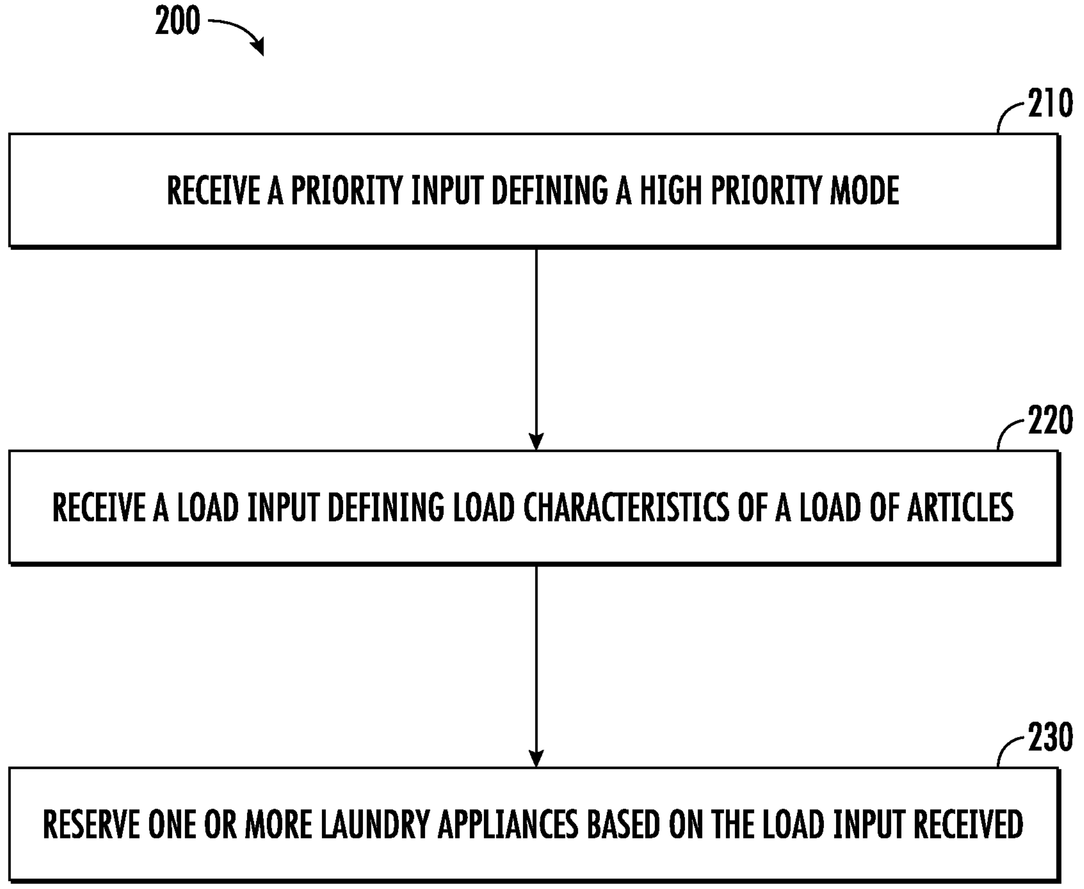
FIG. 3 provides a flow chart illustrating a method of coordinating engagement with a group of laundry appliances according to exemplary embodiments of the present disclosure.

Turning to FIG. 3, now that the construction of a laundry appliance (e.g., washing machine appliance 100) and the configuration of controller 166 and external system 180 according to exemplary embodiments have been presented, exemplary methods (e.g., method 200) of coordinating engagement with a group of laundry appliances will be described. Although the previous discussion herein refers to a washing machine appliance (e.g., appliance 100), one skilled in the art will appreciate that the exemplary methods discussed herein are applicable to coordinating engagement with a variety of other laundry appliances, (e.g., other washing machine appliances, dryer appliances, or laundry appliances in general). Particularly, one skilled in the art would appreciate that the exemplary methods discussed herein are applicable to coordinating engagement with any laundry appliance that may be found in any commercial laundry environment that includes multiple laundry appliances (e.g., a laundromat, dormitory, apartment complex, etc.). In exemplary embodiments, the various method steps as disclosed herein may be performed (e.g., in whole or in part) by controller 166, external device 182, or another, separate controller (e.g., on remote server 186).

FIG. 3 depicts steps performed in a particular order for purpose of illustration and discussion. Those of ordinary skill in the art, using the disclosures provided herein, will understand that (except as otherwise indicated) the steps of the method 200 can be modified, adapted, rearranged, omitted, interchanged, or expanded in various ways without deviating from the scope of the present disclosure.

Advantageously, methods in accordance with the present disclosure may provide a high priority mode for a user account associated with the commercial laundry environment. In some instances, the high priority mode may be a pay-per use mode that prioritizes a user accounts reservation position within a commercial laundry environment. For example, as will be described in more detail below, the high priority mode may prioritize a reservation position for the user account within a reservation queue stored, for example, on a remote server or network in operative communication with the group of laundry appliances in the commercial laundry environment. Additionally, the high priority mode may allow a user account to reserve (e.g., in advance) one or more laundry appliances that are in use at the time of the reservation request. Thus, the high priority mode may allow the user account to reserve the next available laundry appliances in the commercial laundry environment. In this regard, the high priority mode may advantageously minimize the amount of time a user may spend in a commercial laundry environment.

Generally, the high priority mode may be a pay-per-use mode that a user account may purchase for a higher cost (e.g., when compared to the cost of a "normal" operating mode). In some embodiments, the method 200 may include a step 210 of receiving a high priority input defining a high priority mode for a first external device (e.g., external device 182), and more particularly, for a user account associated with the first external device. The first external device may be associated with the group of laundry appliances within the commercial laundry environment. For instance, the high priority input may be transmitted from the first external device (e.g., external device 182), and more particularly, from the user account associated with the first external device and received by a remote server (e.g., remote server 186) or by one or more controllers (e.g., controller 166) of the group of laundry appliances when a user wishes to be assigned a high priority position in a reservation queue of the commercial laundry environment.

When purchased, the high priority mode may assign the user account, or the external device associated with the user account, a high priority position in a reservation queue. In this regard, the method 200 may include recording the first external device, and more particularly, the user account associated with the first external device, to a high priority position in the reservation queue in response to receiving the high priority input.

The reservation queue may organize all of the user accounts or external devices that have requested to reserve (e.g. claim or hold) one or more laundry appliances within the commercial laundry appliance for use. Particularly, the reservation queue may determine when or in what order a particular user account, or a particular external device associated with the user account, may reach (e.g., be placed in) an active reservation position. The active reservation position may permit whichever user account, or external device associated with the user account, that is in the active reservation position to reserve (e.g., claim or hold) one or more laundry appliances within the commercial laundry environment for use. In various embodiments, the reservation queue is stored on the remote server (e.g., remote server 186) or the external devices which the user accounts may be provided on.

In some embodiments, the high priority mode defined by the high priority input is understood as a request to be assigned a high priority reservation position within a reservation queue of the commercial laundry environment. For instance, the high priority mode may assign the associated external device to the active reservation position. In some other embodiments, recording the user account to the high priority position in the reservation queue may include adjusting the reservation position of the user account. For instance, in some such embodiments, adjusting the reservation position of the user account may include exchanging a reservation position of the user account, increasing a reservation position of the user account, or any other suitable adjustment to assign a higher priority to the user account within the reservation queue.

In yet some other embodiments, when multiple external devices each submit a high priority input, the different external devices will be assigned sequential high priority reservation positions. The high priority reservation positions may be ordered according to when the corresponding high priority inputs have been received or transmitted (e.g., if a timestamp of transmission is included with the communication request). The high priority reservation positions may be ordered above normal priority reservation positions. In this regard, in some embodiments, recording the first external device to the high priority reservation position in the reservation queue is based on the order one or more high priority inputs are received or transmitted.

In various other embodiments, recording the first external device to the high priority reservation position in the reservation queue is based on a weighting condition. For instance, the assigned reservation position can be weighted based on the priority input received. For example, user accounts that have transmitted high priority inputs may be weighted such that they have a higher reservation position within the reservation queue priority over user accounts that have transmitted normal priority inputs (e.g., user accounts that have not paid extra for high priority mode).

In some embodiments, the method 200 may also include a step 220 of receiving a load input defining load characteristics following receiving the high priority input. In some instances, the load input is received from the user account. In turn, the load input may be received wirelessly (e.g., via data packets transmitted across one or more wireless networks). Generally, the load characteristics may specify information about a load of laundry to be laundered (e.g., washed or dried). As used herein, the term "load characteristic" and the like is intended to refer to any qualitative or quantitative characteristic of clothes to be laundered or laundry operations. For example, the load characteristic may refer to a fabric type (e.g., the type of materials of the articles in the load of laundry, such as silk, cotton, synthetic, etc.), a load color (such as white, light, dark, or mixed), or a load size (e.g., relative or numerical indication of volume, mass, weight, etc.). In addition, it should be appreciated that the load characteristic may be an approximation or best fit representation of a load of clothes.

Additionally or alternatively, the load characteristics may specify a time period in which the load of laundry is desired to be completed. For example, if a user wishes to minimize the amount of time spent in the commercial laundry environment, the load characteristics may specify a maximum or desired amount of time that the user wishes to stay in the commercial laundry environment.

In some embodiments, the method 200 may further include a step 230 of reserving one or more laundry appliances based on the load input received. In other words, based on the load characteristics (e.g., the amount of articles within the load of laundry, the type of articles within the load of laundry, or the time period in which the load of laundry is desired to be completed in), one or more laundry appliances may be reserved for the user account. For example at step 230, one or more washing machine appliances or one or more dryer appliances may be reserved for the user account based on the load input received at step 220. In some embodiments, reserving the one or more laundry appliances may include locking the one or more laundry appliances and unlocking the one or more laundry appliances via the user account for which the one or more laundry appliances were reserved.

Additionally, the step 230 may further be based on the received high priority input, and more particularly, on the reservation queue of the commercial laundry environment. For instance, the step 230 may be executed following the user account being placed in the active reservation position in the reservation queue. That is, when the user account is at the top of the reservation queue, the one or more laundry appliances may be reserved for the user account.

Optionally, the step 230 may include recommending one or more laundry appliances for utilization based on the load input received. For instance, at step 230 recommendations on the number of, or the type of, washing machine appliances or dryer appliances may be made based on the load input received. For example, based on the load size one or more washing machine appliances may be recommended to wash the articles. Furthermore, in such instances, only one dryer may be recommended to dry the load of articles. The recommendations may be transmitted to the user account and displayed, for instance, on the external device associated with the user account. If an input is received affirming the recommendation of the one or more laundry appliances, the step 230 may also include claiming the one or more laundry appliances for the user account. In this regard, the one or more laundry appliances may be claimed (e.g., reserved) for the user account. Alternatively, if an input is received rejecting the recommendation of the one or more laundry appliances, the user account may be prompted to input the number or type of laundry appliances they desire to utilize.

The step 230 may further include setting operational commands for the one or more reserved laundry appliances. The operational commands for the one or more laundry appliances may include cycle settings of the one or more laundry appliances. For instance, the cycle settings of the one or more laundry appliances may include, but are not limited to, cycle types, cycle settings, or cycle temperature for each laundry appliance reserved. For example, the cycle types may include wash cycle types for washing machine appliances reserved (e.g., delicate cycles, heavy cycles, quick wash cycles, etc.). As another example, the cycle types may include dry cycle types for dryer appliances reserved (e.g., auto dry cycles, delicate dry cycles, air fluff cycles, etc.). Additionally or alternatively, the operational commands may be set manually, for instance, from the control panel attached to a laundry appliance of the group of laundry appliances.

Further, the method 200 may include activating the one or more laundry appliances in response to the one or more operational commands being set. In some embodiments, the one or more laundry appliances may be activated via a local user interface, e.g., by pressing a button on a user interface panel, or via the external device, such as selecting the one or more laundry appliances on a touchscreen, e.g., of a smartphone. The laundry appliance may be activated in response to a start input received via a local user interface, e.g., by pressing a button on the user interface panel, or via the external device, such as an input on a touchscreen, e.g., of a smartphone. The laundry treatment operation may include, for example, washing or drying articles in the one or more laundry appliances. Activating one or more laundry appliances may include a performing a laundry treatment operation such as a wash cycle including flowing wash liquid into a tub, urging wash liquid through the washing machine appliance by a pump, and rotating a basket by a motor, etc. In addition, activating one or more laundry appliances may include a performing a laundry treatment operation such as a dry cycle including rotating a drum, and activating a heating system, as is generally understood by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of coordinating engagement with a group of laundry appliances, the method comprising:

receiving, wirelessly, a high priority input defining a high priority mode for a user account associated with the group of laundry appliances;

recording the user account to a high priority reservation position in a reservation queue in response to receiving the high priority input;

receiving, wirelessly, a load input defining load characteristics of a load of articles following receiving the high priority input; and reserving one or more laundry appliances for the user account based on the load input received.

2. The method of claim 1, further comprising:

setting operational commands for the one or more laundry appliances following reserving one or more laundry appliances.

3. The method of claim 2, wherein the operational commands comprise cycle settings for laundry cycles of the one or more laundry appliances reserved.

4. The method of claim 2, wherein the operational commands are set via manipulation of a control panel of the group of laundry appliances.

5. The method of claim 2, further comprising:

activating the one or more laundry appliances based on the operational commands.

6. The method of claim 1, wherein recording the user account the high priority reservation position in the reservation queue comprises exchanging reservation positions with another user account in the reservation queue.

7. The method of claim 1, wherein reserving one or more laundry appliances is further based on the high priority reservation position of the user account the reservation queue.

8. A method of coordinating engagement with a group of laundry appliances, the method comprising:

receiving a high priority input defining a high priority mode for a user account associated with the group of laundry appliances;

recording the user account to a high priority reservation position in a reservation queue in response to receiving the high priority input;

receiving a load input defining load characteristics of a load of laundry following receiving the high priority input; and reserving one or more laundry appliances based on the load input received.

9. The method of claim 8, further comprising:

setting operational commands for the one or more laundry appliances following reserving one or more laundry appliances.

10. The method of claim 9, wherein the operational commands comprise cycle settings for laundry cycles of the one or more laundry appliances reserved.

11. The method of claim 9, wherein the operational commands are set via manipulation of a control panel of the group of laundry appliances.

12. The method of claim 9, further comprising:

activating the one or more laundry appliances based on the operational commands.

13. The method of claim 8, wherein recording the user account the high priority reservation position in the reservation queue comprises exchanging priority reservation positions with another user account in the reservation queue.

14. The method of claim 8, wherein reserving one or more laundry appliances is further based on the high priority reservation position of the user account in the reservation queue.

15. The method of claim 8, wherein the high priority input is received wirelessly from the user account.

16. The method of claim 8, wherein the high priority input is received via manipulation of a control panel of the group of laundry appliances.

* * * * *